United States Patent
Abbassi et al.

(10) Patent No.: US 10,724,412 B2
(45) Date of Patent: Jul. 28, 2020

(54) EXHAUST SYSTEM FOR A WORK VEHICLE

(71) Applicant: CNH Industrial America LLC, New Holland, PA (US)

(72) Inventors: Hesam Abbassi, Chicago, IL (US); Panos Tamamidis, Northbrook, IL (US); Samrendra Kumar Singh, Bolingbrook, IL (US); Daniel J. Zurn, Horace, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/849,315

(22) Filed: Dec. 20, 2017

(65) Prior Publication Data

US 2019/0186321 A1    Jun. 20, 2019

(51) Int. Cl.
| | |
|---|---|
| *F01N 3/08* | (2006.01) |
| *F01N 3/20* | (2006.01) |
| *F01N 13/00* | (2010.01) |
| *F01N 3/035* | (2006.01) |
| *F01N 3/36* | (2006.01) |

(Continued)

(52) U.S. Cl.
CPC ........... *F01N 3/2073* (2013.01); *F01N 3/035* (2013.01); *F01N 3/0814* (2013.01); *F01N 3/103* (2013.01); *F01N 3/2066* (2013.01); *F01N 3/2892* (2013.01); *F01N 3/36* (2013.01); *F01N 13/001* (2013.01); *F01N 13/082* (2013.01); *F01N 2240/20* (2013.01); *F01N 2590/08* (2013.01); *F01N 2610/02* (2013.01)

(58) Field of Classification Search
CPC .. B01F 5/0616; B01F 5/0451; B01F 5/04049; B01F 5/0268; B01D 53/9431; B01D 53/90; B01D 53/86; F01N 3/36; F01N 3/2892; F01N 2240/20; F01N 2330/38; F01N 2470/10

USPC .......................................... 60/286, 295, 317
See application file for complete search history.

(56) References Cited

U.S. PATENT DOCUMENTS

| | | |
|---|---|---|
| 5,116,579 A | 5/1992 | Kobayashi et al. |
| 5,809,775 A | 9/1998 | Tarabulski et al. |

(Continued)

FOREIGN PATENT DOCUMENTS

| | | |
|---|---|---|
| DE | 102015122009 A1 | 6/2017 |
| FR | 3040193 | 2/2017 |
| WO | 2016036298 A1 | 3/2016 |

*Primary Examiner* — Thai Ba Trieu
*Assistant Examiner* — Dapinder Singh
(74) *Attorney, Agent, or Firm* — Rickard K. DeMille; Rebecca L. Henkel (57) ABSTRACT

An exhaust system for a work vehicle includes a mixer that includes a nozzle configured to receive a first exhaust flow along a lateral axis through a plurality of openings in a peripheral wall of the nozzle. The nozzle also receives a diesel exhaust fluid along a longitudinal axis through a longitudinal inlet. Further, the nozzle is configured to mix the first exhaust flow and the diesel exhaust fluid to form an exhaust solution. In addition, the mixer includes a conduit configured to receive the exhaust solution along the longitudinal axis. Moreover, the conduit has an opening configured to receive a portion of the nozzle, and the conduit is configured to receive a second exhaust flow through a gap formed between the nozzle and the conduit at the opening, and the opening is positioned downstream of the plurality of openings.

11 Claims, 5 Drawing Sheets

(51) Int. Cl.
*F01N 13/08* (2010.01)
*F01N 3/28* (2006.01)
*F01N 3/10* (2006.01)

(56) References Cited

U.S. PATENT DOCUMENTS

| | | |
|---|---|---|
| 6,063,350 A | 5/2000 | Tarabulski et al. |
| 6,905,658 B2 | 6/2005 | Rogers et al. |
| 7,150,145 B2 | 12/2006 | Patchett et al. |
| 7,815,881 B2 | 10/2010 | Lin et al. |
| 8,449,288 B2 | 5/2013 | Higgins |
| 8,459,017 B2 | 6/2013 | Paterson et al. |
| 9,267,413 B2 | 2/2016 | Morey |
| 9,409,124 B2 | 8/2016 | Cohen et al. |
| 2005/0150217 A1* | 7/2005 | Crawley ............ F01N 3/025 60/295 |
| 2012/0144809 A1 | 6/2012 | Ducroquet |
| 2012/0315204 A1 | 12/2012 | Osumi |
| 2014/0334986 A1* | 11/2014 | Stanavich ............ B01F 5/0451 422/168 |
| 2016/0215673 A1* | 7/2016 | Noren, IV ............ F01N 3/2892 |
| 2016/0326938 A1 | 11/2016 | Zhang |
| 2017/0037759 A1 | 2/2017 | Liu et al. |
| 2017/0107877 A1 | 4/2017 | Johnson et al. |

\* cited by examiner

EXHAUST SYSTEM FOR A WORK VEHICLE

BACKGROUND

The present disclosure relates generally to work vehicles (e.g., agricultural vehicles) with diesel engines, and more particularly, to an exhaust system configured to reduce emissions from a diesel engine of a work vehicle.

Certain work vehicles (e.g., agricultural vehicles) are powered by diesel engines, which burn diesel fuel and produce exhaust gas. The exhaust gas may include undesirable byproducts such as nitrogen oxides (NOx), carbon monoxide, and particulate material. Certain work vehicles include an exhaust system that reduces the concentration of the undesired byproducts. Traditional exhaust systems may spray a diesel exhaust fluid (DEF) collinearly within the flow of exhaust gas or against a wall of a mixer. Government regulations have reduced the acceptable concentrations of the byproducts within the exhaust gas, particularly in relation to NOx. The traditional exhaust systems may not be able to satisfy new or future regulatory limits. These new regulations urge more efficient methods of regulating exhaust gases while minimizing the packaging size of the exhaust system to reduce the impact on the design of the entire vehicle.

BRIEF DESCRIPTION

In one embodiment, an exhaust system for a work vehicle includes a mixer that includes a nozzle configured to receive a first exhaust flow along a lateral axis through a plurality of openings in a peripheral wall of the nozzle. The nozzle also receives a diesel exhaust fluid along a longitudinal axis through a longitudinal inlet. Further, the nozzle is configured to mix the first exhaust flow and the diesel exhaust fluid to form an exhaust solution. In addition, the mixer includes a conduit configured to receive the exhaust solution along the longitudinal axis. Moreover, the conduit has an opening configured to receive a portion of the nozzle, and the conduit is configured to receive a second exhaust flow through a gap formed between the nozzle and the conduit at the opening, and the opening is positioned downstream of the plurality of openings.

In another embodiment, an exhaust system for a work vehicle includes a mixer that includes a conduit configured to receive an exhaust solution includes an exhaust and a diesel exhaust fluid along a longitudinal axis. Further, the conduit has a first opening configured to receive a first exhaust flow. A nozzle is disposed within the first opening, and the nozzle forms an annular opening configured to receive the first exhaust flow. The mixer also includes a flow disruptor positioned downstream from the first opening, and the flow disruptor is configured to disrupt the flow of the exhaust solution.

In a further embodiment, an exhaust system for a work vehicle includes a mixer that includes a first nozzle configured to spray a diesel exhaust fluid through a longitudinal inlet. The mixer also includes a second nozzle coupled to the first nozzle, and the second nozzle is configured to receive a first exhaust flow along a lateral axis through a plurality of slats in a peripheral wall of the second nozzle. In addition, the second nozzle is configured to receive the diesel exhaust fluid along a longitudinal axis through the longitudinal inlet. Moreover, the second nozzle is configured to mix the first exhaust flow and the diesel exhaust fluid to form an exhaust solution. The mixer further includes a conduit configured to receive the exhaust solution along the longitudinal axis, and the conduit has an opening configured to receive a portion of the second nozzle. Also, the conduit is configured to receive a second exhaust flow through a gap formed between the second nozzle and the conduit at the opening, and the opening is positioned downstream of the plurality of openings. In addition, the mixer includes a flow disruptor downstream from the opening, and the flow disruptor is configured to disrupt the flow of the exhaust solution.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include an exhaust system for a diesel engine of a work vehicle (e.g., an agricultural vehicle). As regulations regarding exhaust emissions continue to become more stringent regarding the concentration of expelled byproducts (e.g., nitrogen oxides), manufacturers strive to produce more effective and efficient exhaust systems. Certain exhaust systems are configured to introduce a sprayed fluid (e.g., DEF) into the diesel exhaust. Some exhaust systems spray the DEF collinearly with the flow of exhaust, thereby creating a distribution of the DEF within the exhaust that is at least partially non-uniform. As discussed in detail below, the exhaust system of the present disclosure includes a mixer that mixes diesel exhaust with the DEF. Because the mixer provides a substantially uniform and efficient mixture of DEF and exhaust gas, the mixer may cause the exhaust system to emit lower emissions than that of current exhaust systems. Additionally, the efficient mixing of DEF and exhaust gas enables the exhaust system to use less DEF, thereby reducing the cost to operate the exhaust system. Further, because of the compact design, the mixer may be disposed within a housing of another exhaust system component (e.g., diesel oxidation catalyst housing or selective catalytic reduction housing). Furthermore, in various embodiments of the present disclosure, the exhaust system reduces the amount of backpressure across the exhaust system, thereby increasing the efficiency of the engine. The engine efficiency is increased by directing more of the engine's power to rotational motion rather than siphoning power to force exhaust gas through the exhaust system. By increasing engine efficiency, the engine may provide more power to the work vehicle while consuming less fuel, thereby further decreasing emissions.

Figure 1:
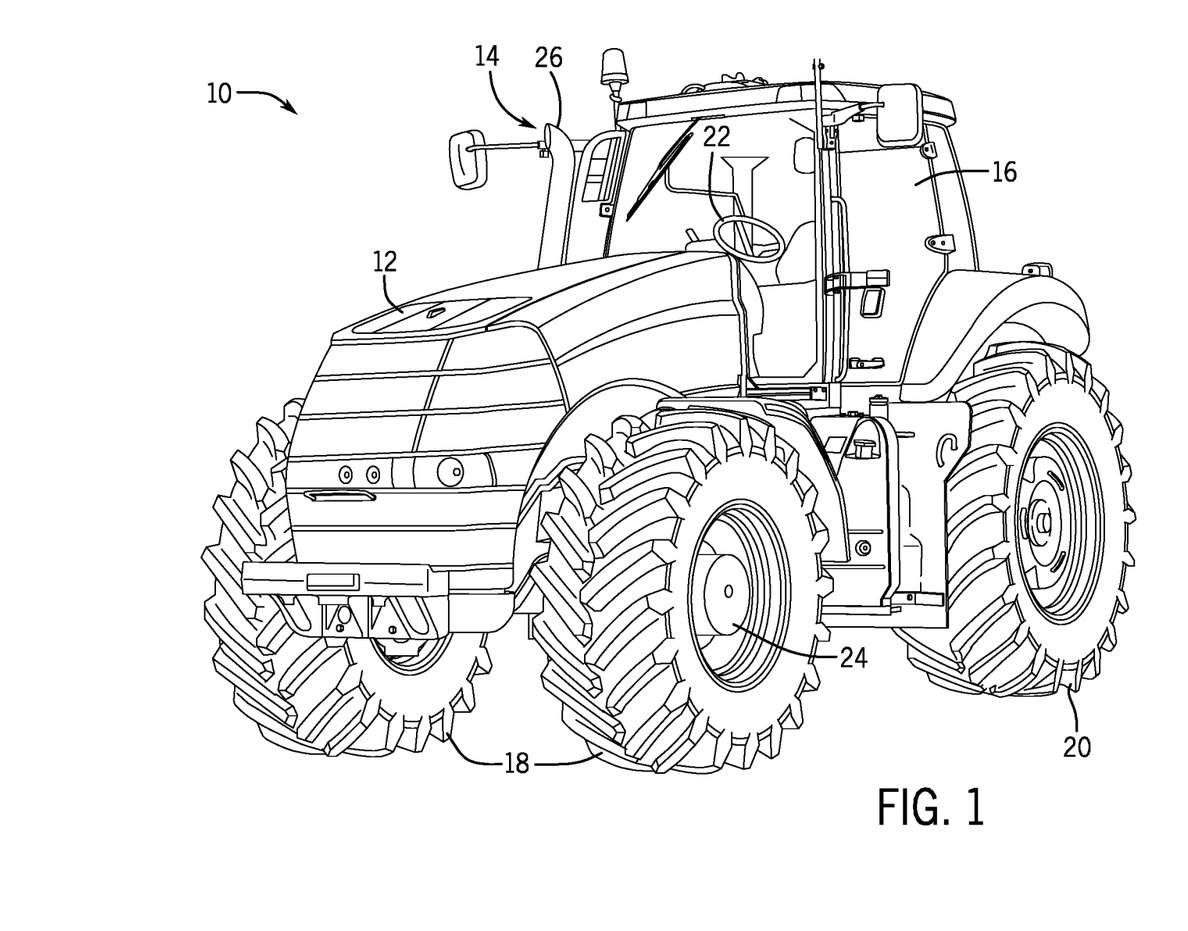
FIG. 1 is a perspective view of an embodiment of a work vehicle which employs an exhaust system for a diesel engine.

FIG. 1 is a perspective view of an embodiment of a work vehicle 10 which includes an exhaust system for a diesel engine. In certain embodiments, the work vehicle 10 may be a tractor, off-road vehicle, agricultural work vehicle, or any other suitable vehicle that may include an exhaust system for a diesel engine. The illustrated work vehicle 10 has a body 12 that may house an engine (e.g., diesel engine), transmission, cooling system, and power train. The body 12 also houses a portion of an exhaust system 14. Further, the work vehicle 10 has a cabin 16 where an operator may sit or stand to operate the work vehicle 10. The work vehicle 10 has two front wheels 18 and two rear wheels 20 that rotate to move the work vehicle 10. In certain embodiments, the work vehicle 10 is maneuvered using a steering wheel 22 that causes the front wheels 18 to turn. As illustrated, the front wheels 18 are coupled to an axle 24 (e.g., fixed or suspended) that supports the front wheels 18, and facilitates wheel rotation. The exhaust system 14 may be routed around various systems within the body 12, such as a cooling system. The exhaust system 14 includes an exhaust pipe 26 which carries the exhaust gas away from the body, and directs the exhaust gas away from the cabin 16.

Figure 2:
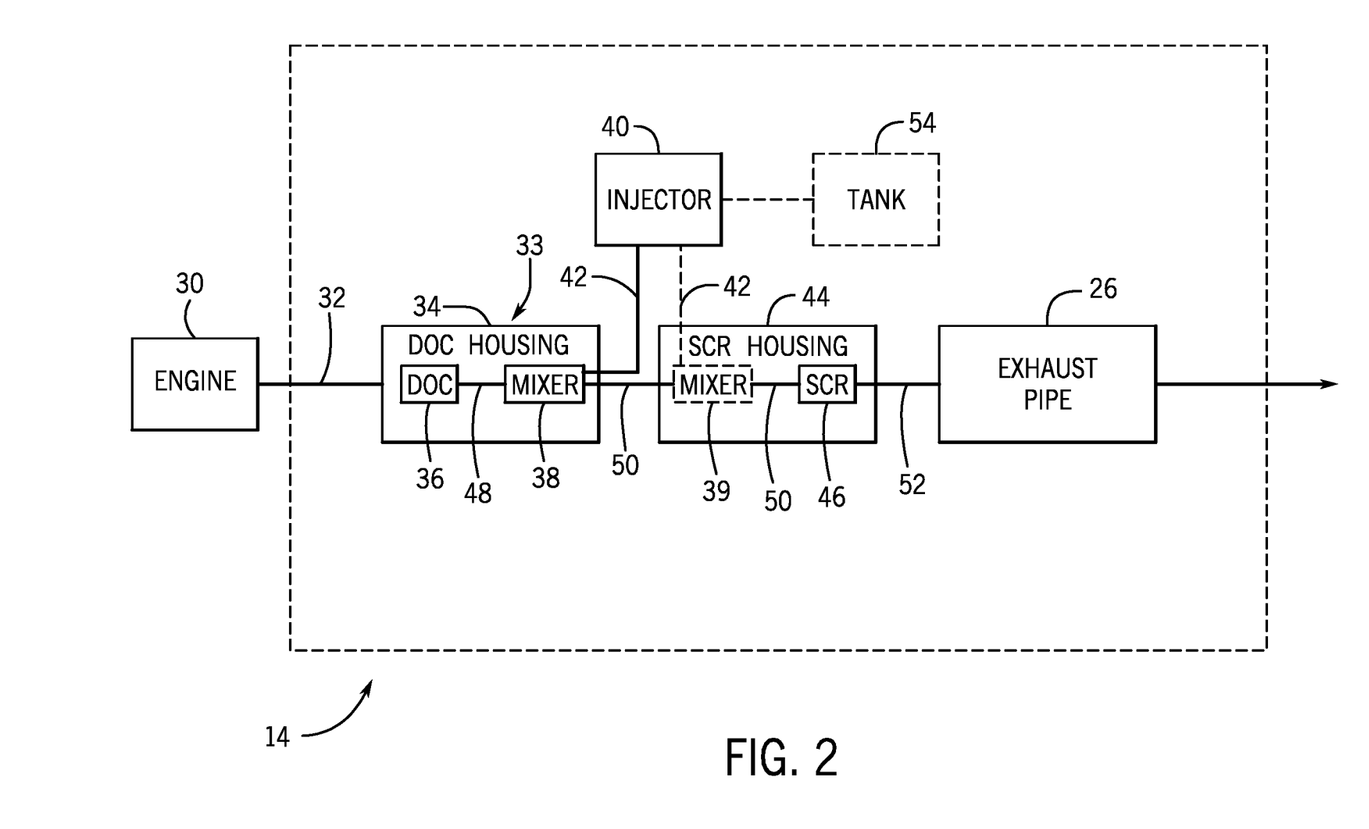
FIG. 2 is a schematic view of an embodiment of the exhaust system of FIG. 1.

FIG. 2 is a schematic view of an embodiment of an exhaust system 14 that may be employed within the work vehicle of FIG. 1. In the illustrated embodiment, an engine 30 expels exhaust gas 32 to the exhaust system 14. In the illustrated embodiment, the exhaust system 14 includes a diesel oxidation catalyst (DOC) assembly 33 having a housing 34 containing a DOC 36 and a DOC mixer 38. The exhaust system 14 also includes an injector 40 for injecting diesel exhaust fluid (DEF) 42 into the mixer 38. The exhaust system 14 also includes a selective catalytic reduction (SCR) housing 44 containing an SCR mixer 39 and an SCR module 46. Certain embodiments of the exhaust system 14 may additionally include a diesel particulate filter to capture particulate matter, a muffler, or any other element suitable for use in an exhaust system.

The DOC housing 34 receives exhaust gas 32, and directs the exhaust gas 32 into the DOC 36. The DOC 36 receives the exhaust and catalyzes the oxidization of carbon monoxide to carbon dioxide by using excess oxygen in the exhaust gas 32. Similarly, the DOC 36 uses excess oxygen to catalyze the conversion of hydrocarbons to water and carbon dioxide. In certain embodiments, the DOC 36 may use ceramics, metals (e.g., platinum, palladium, etc.), or other suitable catalysts to catalyze the oxidization of the hydrocarbons and carbon monoxide molecules. Thus, the DOC 36 receives raw exhaust gas 32 and outputs catalyzed exhaust 48 with reduced concentrations of hydrocarbons and carbon monoxide. The DOC housing 34 directs the exhaust 48 to the DOC mixer 38, which is enclosed within the DOC housing 34. The DOC mixer 38 receives the DEF 42 from the injector 40, in addition to the exhaust 48 from the DOC 36. In certain embodiments, the exhaust system 14 includes a tank for containing the DEF 42, and supplying the DEF to the injector 40. Alternatively, the injector 40 may include a tank 54 containing DEF 42. In further embodiments, the tank 54 containing the DEF 42 may be remote from the injector 40. In certain embodiment, the DOC mixer 38 may be disposed within the SCR housing 44, a separate housing, or any other housing suitable for containing the DOC mixer 38.

The injector 40 sprays the DEF 42 into the exhaust 48 within the DOC mixer 38. The DEF 42 is a solution used to aid in the reduction of NOx from the exhaust 48. For example, in certain embodiments, the DEF 42 may be an aqueous urea solution which undergoes thermal decomposition and hydrolysis within the exhaust system 14 to produce ammonia, which the SCR uses to convert the NOx into nitrogen and water. The DOC mixer 38 provides an initial mixing of the exhaust 48 and the DEF 42. Then, the exhaust and DEF mixture travels to the SCR housing 44 and passes through the SCR mixer 39 that provides additional mixing to the exhaust 48 and DEF 42. Thus, the SCR mixer 39 supplies well-mixed exhaust solution 50 to the SCR module 46. The SCR module 46 receives the exhaust solution 50 and uses the distributed DEF 42 to reduce the NOx concentration in the exhaust gas. Finally, the SCR module 46 outputs processed exhaust 52 with a reduced NOx concentration through the exhaust pipe 26 to be released into the atmosphere.

Figure 3:
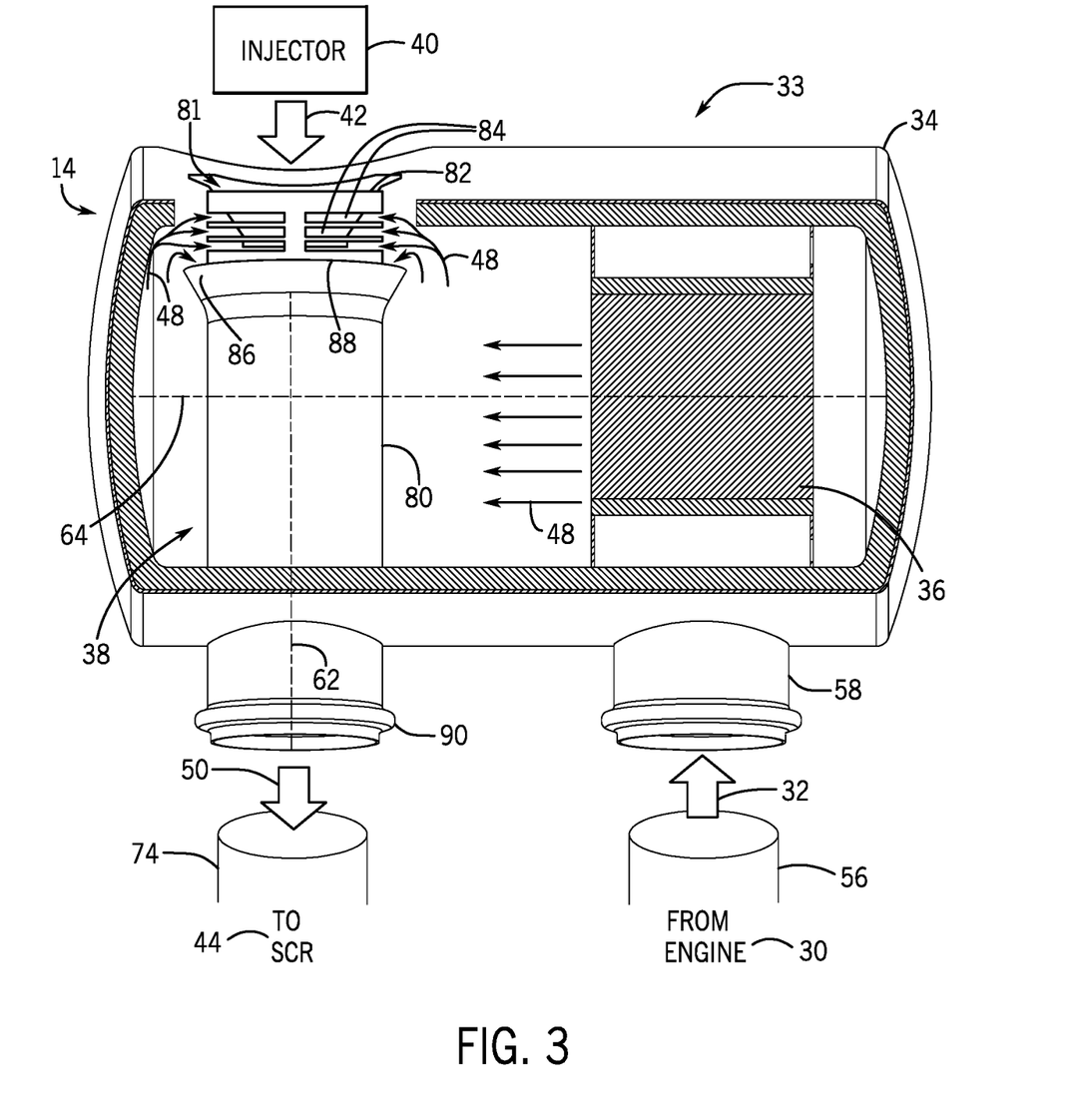
FIG. 3 is a cross-sectional view of an embodiment of a diesel oxidation catalyst (DOC) assembly, which may be employed within the exhaust system of FIG. 1.

FIG. 3 is a cross-sectional view of an embodiment of a DOC assembly 33, which may be employed within the exhaust system 14 of FIG. 1. For reference, the DOC mixer 38 has a longitudinal axis 62. Likewise, the DOC mixer 38/DOC housing 34 has a lateral axis 64. In the illustrated embodiment, the DOC mixer 38 and the DOC 36 are disposed within the DOC housing 34. The longitudinal axis 62 of the DOC mixer 38 is perpendicular to the lateral axis 64 of the DOC mixer 38/DOC housing 34. In alternative embodiments, the DOC mixer 38 may be disposed within the SCR housing 44, upstream of the SCR module along the exhaust flow path. The engine 30 provides exhaust 32 to the exhaust system 14 through the exhaust conduit 56. The exhaust 32 enters the DOC housing 34 through an intake conduit 58, which is coupled to the exhaust conduit 56. The exhaust 32 then flows through the DOC 36. The DOC 36 provides an oxidization catalyst to facilitate the oxidization of unburned hydrocarbons and carbon monoxide. The oxidization of unburned hydrocarbons and carbon monoxide in the DOC 36 converts the hydrocarbons and carbon monoxide into water and carbon dioxide. Thus, the exhaust 48, which contains reduced amounts of hydrocarbons and carbon monoxide, flows toward the DOC mixer 38.

The DOC mixer 38 includes a conduit 80, a first nozzle 81 for spraying DEF 42, a second nozzle 82 having slats 84. The conduit 80 includes a flared portion 86 at a distal end 88 of the conduit 80. The proximal end 90 of the conduit 80 may be coupled to a pipe 74 by a suitable attachment, such as a welded connection, slip joint, bracket, or clamp. In certain embodiments, the proximal end 90 of the conduit 80 may be coupled to the DOC housing 34 by a suitable attachment, such as a welded connection, slip joint, bracket, or clamp. The first nozzle 81 extends from the DOC housing 34, and at least partially engages the second nozzle 82. In addition, the second nozzle 82 is disposed within the conduit 80, thereby establishing an annular opening between the flared portion 86 of the conduit 80 and the second nozzle 82. Further, the first nozzle 81 is configured to receive the DEF 42 from the injector 40. The exhaust 48 flows toward the distal end 88 of the conduit 80, and enters the conduit 80 through the slats 84 of the second nozzle 82 and through the flared portion 86 of the conduit 80 as an annular flow. The flow of the DEF 42 toward the inner walls of the conduit 80 is substantially reduced, which may reduce the amount of DEF 42 attaching to the inner walls. Within the conduit 80, the exhaust 48 is combined with sprayed DEF 42 to form the well-mixed exhaust 50. The well-mixed exhaust 50 is then supplied to the SCR module through the pipe 74.

Figure 4:
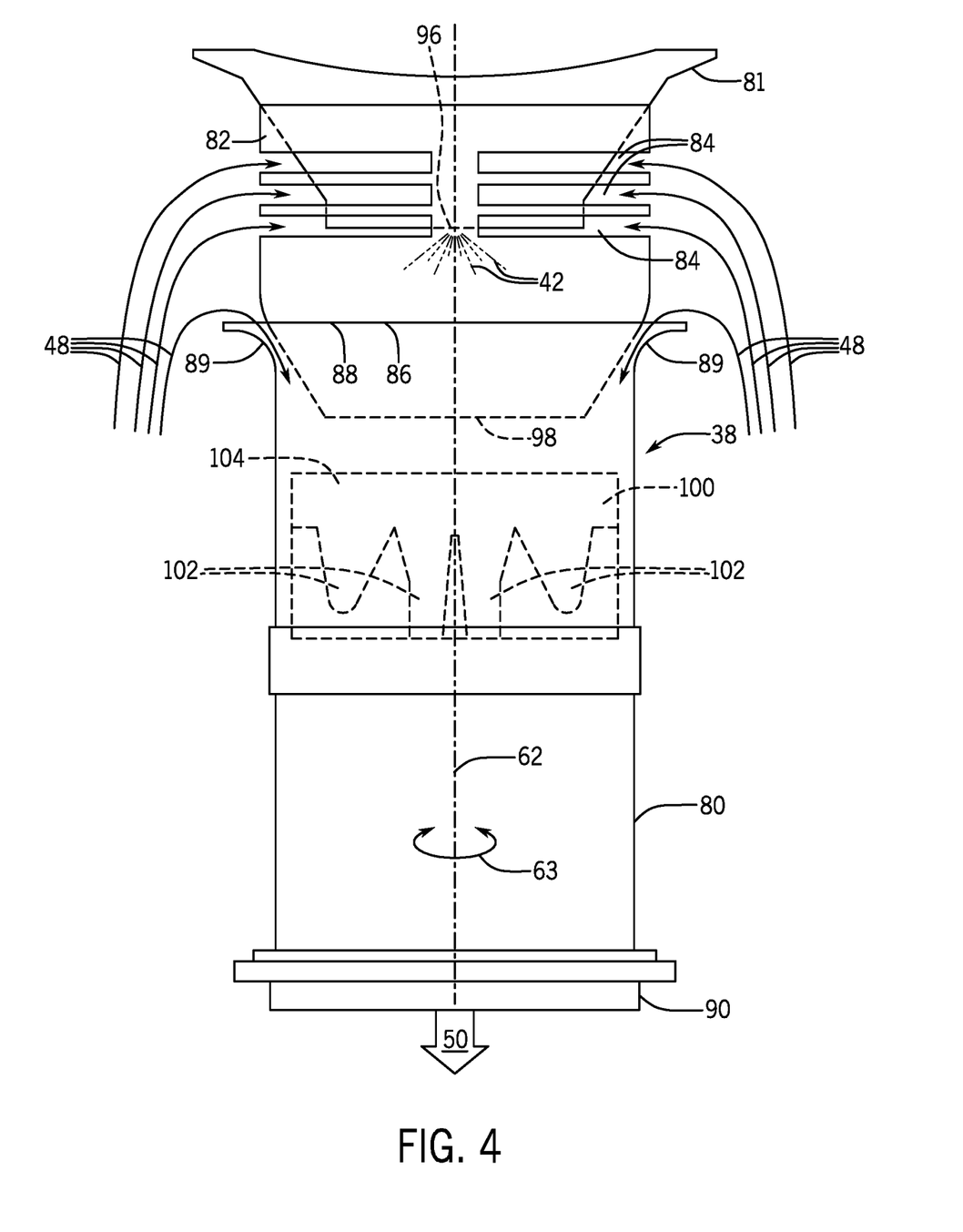
FIG. 4 is a cross-sectional view of an embodiment of a mixer, which may be employed within the DOC assembly of FIG. 3.

FIG. 4 is a cross-sectional view of the DOC mixer 38, which may be employed within the DOC assembly of FIG. 3. The second nozzle 82 extends at least partially into the flared portion 86 of the distal end 88 of the conduit 80. Additionally, the second nozzle 82 includes the slats 84 configured to receive the exhaust 48. In certain embodiments, the first nozzle 81 of the mixer directly couples to the DOC housing at an opening 96 of the first nozzle 81. In some embodiments, the injector 40 may be indirectly coupled to the opening 96 by an intermediary conduit. Further, the first nozzle 81 is coupled to the second nozzle 82 by a first slip joint, and the second nozzle 82 is coupled to the conduit 80 by a second slip joint. The slip joints enable expansion and contraction of the coupled components while maintaining the coupling. In some embodiments, at least one coupling may be formed via another suitable coupling (e.g., a weld or bolts).

The injector sprays DEF 42 into the DOC mixer 38 through the opening 96 of the first nozzle 81 approximately along the longitudinal axis 62. The exhaust flows through the slats 84 upstream of the opening 96 to create an annular flow of exhaust 48 through the second nozzle 82. The annular flow of exhaust 48 enables the mixing of the DEF 42 and the exhaust 48 to begin immediately upon the DEF 42 exiting the opening 96. Further, the annular flow of exhaust 48 at least partially blocks the flow of the DEF 42 toward the inner walls of the second nozzle 82 and the conduit 80. Because the DEF 42 is still in a liquid state at the opening 96, the DEF 42 may adhere to the inner walls upon contact.

Further each slat 84 extends only partially along a surface of the second nozzle 82 along a circumferential axis 63, such as 10 degrees, 15 degrees, 20 degrees, 30 degrees, 35 degrees, 45 degrees, or more degrees. Further, while the illustrated slates 84 are substantially rectangular, the slats 84 may include any suitable shape, including circles, ellipsoids, triangles, quadrilaterals, etc. In the present embodiment, the slats 84 are substantially evenly spaced from one another along the longitudinal axis 62. In some embodiments, the slats 84 may have uneven spacing between each one. Further, in some embodiments, the slats 84 may be separated into groups of slats 84. For example, the slats of one group (e.g., closer to the distal end 88) may be closely spaced to one another, and slats of another group (e.g., further from the distal end 88) may be further spaced from one another.

The exhaust 48 flows in a direction cross-wise to the DEF 42 flow as the exhaust approaches an annular opening 89, formed by the flared portion 86. The exhaust 48 then changes direction as it enters the annular opening 89, thereby establishing a turbulent flow that facilitates mixing of the exhaust 48 with the DEF 42 to create the well-mixed exhaust 50. By mixing the DEF 42 in a turbulent flow, the mixing of the DEF 42 with the exhaust is enhanced, thereby reducing emissions and/or the amount of DEF 42 used in the exhaust system 14. To increase the mixing of the DEF 42 and the exhaust 48, a converging section 98 of the second nozzle 82 is included which has a decreasing diameter. The converging section 98 may increase the velocity of the DEF 42 and exhaust 48 mixture, which may further increase turbulence. In addition, the converging section 98 may direct the DEF 42 and exhaust 48 to a central portion of the conduit 80, and away from the inner walls of the conduit, which may decrease the likelihood of contact between the DEF 42 and the inner walls of the conduit 80. Further, the converging section 98 may include a non-circular cross section. For example, the cross-section of the converging section 98 may be a star shape, wavy, triangular, square, or any other suitable shape that increases the turbulence of the flow of the DEF 42 and the exhaust 48.

To further increase the mixing of the DEF 42 and the exhaust 48, a flow disruptor 100 is included in the conduit 80 downstream of the flared portion 86. The flow disruptor 100 includes multiple baffles 102 extending from an upper portion 104 of the flow disruptor 100, and the baffles 102 disrupt the flow of the DEF 42 and the exhaust 48 to further increase the turbulence. The baffles 102 may include any suitable structure that disrupts the flow of the DEF 42 and the exhaust 48. Further, the flow disruptor 100 may engage the inner walls of the conduit 80 such that all of the fluid flowing through the conduit 80 passes through the flow disruptor 100. The upper portion 104 of the flow disruptor 100 includes one or more passages through which the DEF 42 and the exhaust 48 may flow. As the DEF 42 and the exhaust 48 flow through the flow disruptor 100, the DEF 42 and the exhaust 48 flow between the baffles 102, which change the direction of the flow, thereby increasing the turbulence and mixing of the DEF 42 and the exhaust 48. The baffles 102 may extend from the upper portion 104 in any suitable arrangement. For example, baffles 102 may have similar shapes to each other, or some baffles 102 may share a similar shape while other baffles 102 have a different shape. Further, each baffle 102 may have a different shape. In addition, the baffles 102 may extend from the upper portion 104 in a pattern. For example, the baffles 102 may extend in rows and/or columns.

By delivering the sprayed DEF 42 along the longitudinal axis 62 of the exhaust flow, the sprayed DEF 42 mixes with the exhaust 48 to create well-mixed exhaust 50. Additionally, because the second nozzle 82 includes the converging section 98, the speed of the exhaust 48 is increased, and the pressure drop through the DOC mixer 38 is reduced, which also reduces the backpressure in the exhaust system and/or engine. Reducing the pressure drop through the DOC mixer 38 further reduces emissions from the exhaust system 14. The well-mixed exhaust 50, which includes a substantially uniform mixture of exhaust 48 and the sprayed DEF 42, reacts in the presence of the heat from the exhaust 48 and the exhaust system 14, thereby undergoing thermal decomposition and hydrolysis to create ammonia and water within the well-mixed exhaust 50. The well-mixed exhaust 50 is supplied to the SCR module for further catalytic reduction.

Figure 5:
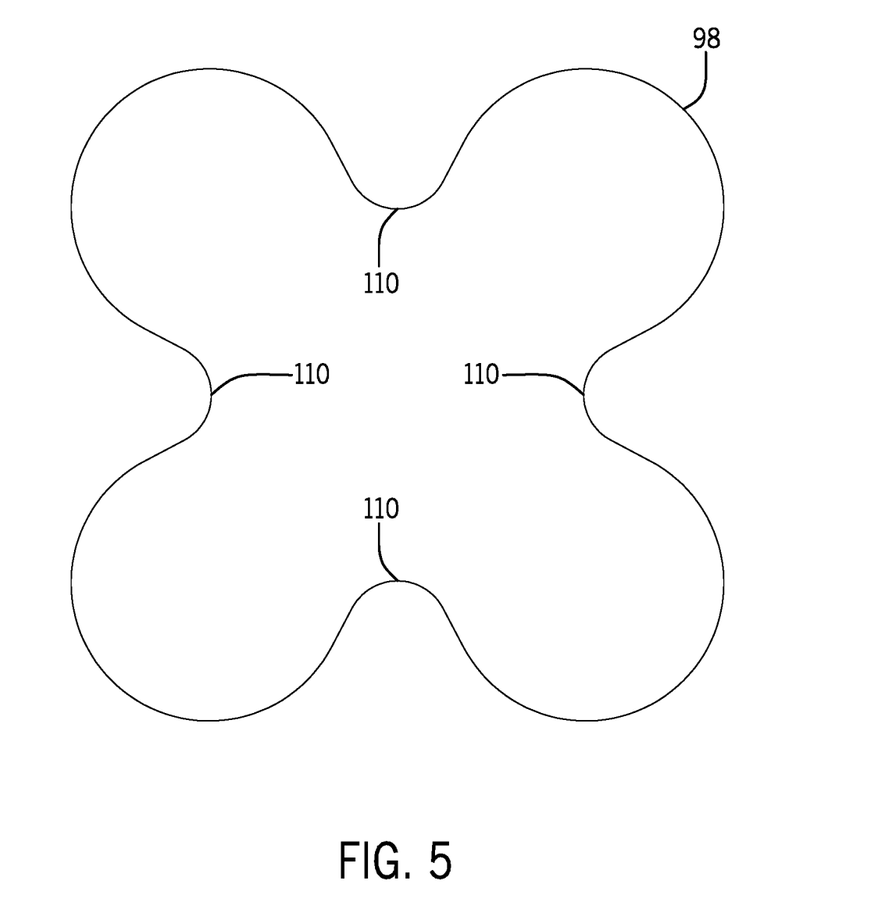
FIG. 5 is a cross-sectional view of an embodiment of a converging section of a nozzle that may be employed within the mixer of FIG. 4.

FIG. 5 is a cross-sectional view of an embodiment of a converging section 98 of a second nozzle that may be employed within the mixer of FIG. 4. As illustrated, the converging section 98 has a star shape. Because the cross-sectional area of the converging section 98 is reduced due to the star shape, the velocity of the fluid flowing through the converging section 98 increases, and the turbulence of the fluid flowing through the converging section 98 also increases. Further, the inward curves 110 of the converging section 98 increase the shear of the fluid flowing through the converging section 98, which facilitates aerosolizing the DEF and further increasing turbulence. The present embodiment has four inward curves 110; however, some embodiments may include any suitable number of inward curves 110, including 1, 2, 3, 5, 6, 7, or more.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.)) without materially departing from the novel teachings and advantages of the subject matter recited in the claims. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An exhaust system for a work vehicle comprising:

a mixer comprising:

a conduit configured to receive an exhaust solution including an exhaust and a diesel exhaust fluid along a longitudinal axis, wherein the conduit has a first opening configured to receive a first exhaust flow, and wherein a nozzle is disposed within the first opening, and the nozzle forms an annular opening configured to receive the first exhaust flow; and a flow disruptor positioned downstream from the first opening, wherein the flow disruptor is configured to disrupt the flow of the exhaust solution;

wherein the nozzle is configured to receive a second exhaust flow through a plurality of slats and the diesel exhaust fluid along the longitudinal axis, and the plurality of slats are upstream of the flow disruptor.

2. The exhaust system of claim 1, wherein each of the plurality of slats extends at least 30 degrees along a peripheral wall of the nozzle.

3. The exhaust system of claim 1, wherein the mixer comprises another nozzle having a second opening configured to spray the diesel exhaust fluid downstream of at least a portion of the plurality of slats.

4. The exhaust system of claim 1, wherein the nozzle has a converging section having a non-circular cross-section.

5. The exhaust system of claim 4, wherein the converging section of the nozzle has a star-shaped cross-section.

6. The exhaust system of claim 1, wherein the flow disruptor comprises a plurality of baffles extending from a top portion of the flow disruptor.

7. The exhaust system of claim 6, wherein the plurality of baffles extend from the top portion to form a corresponding plurality of rows.

8. An exhaust system for a work vehicle comprising:

a mixer comprising:

a first nozzle configured to spray a diesel exhaust fluid through a longitudinal inlet;

a second nozzle coupled to the first nozzle, wherein the second nozzle is configured to receive a first exhaust flow along a lateral axis through a plurality of slats in a peripheral wall of the second nozzle and to receive the diesel exhaust fluid along a longitudinal axis through the longitudinal inlet, and the second nozzle is configured to mix the first exhaust flow and the diesel exhaust fluid to form an exhaust solution;

a conduit configured to receive the exhaust solution along the longitudinal axis, wherein the conduit has an opening configured to receive a portion of the second nozzle, the conduit is configured to receive a second exhaust flow through a gap formed between the second nozzle and the conduit at the opening, and the opening is positioned downstream of the plurality of openings; and a flow disruptor downstream from the opening, wherein the flow disruptor is configured to disrupt the flow of the exhaust solution.

9. The exhaust system of claim 8, wherein the first nozzle and the second nozzle are coupled via a slip joint.

10. The exhaust system of claim 8, wherein the second nozzle has a converging section having a non-circular cross-section.

11. The exhaust system of claim 10, wherein the converging section of the second nozzle has a star-shaped cross-section.

* * * * *